Aug. 2, 1949.   W. McARTHUR   2,477,997
TUBULAR JOINT
Filed Aug. 10, 1945
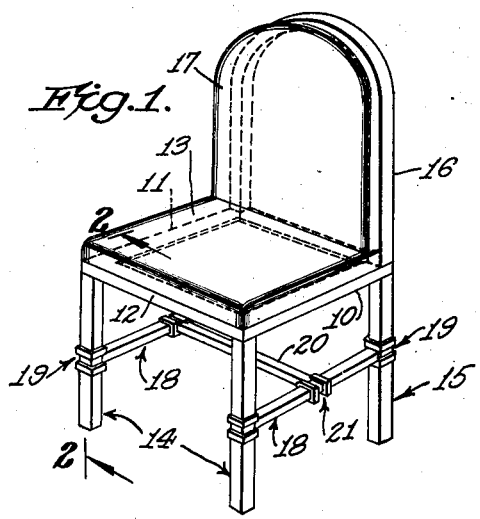
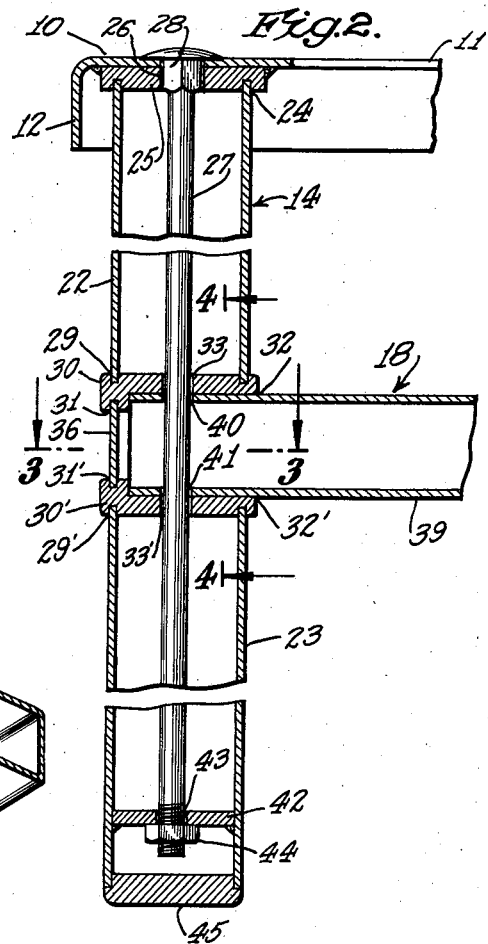
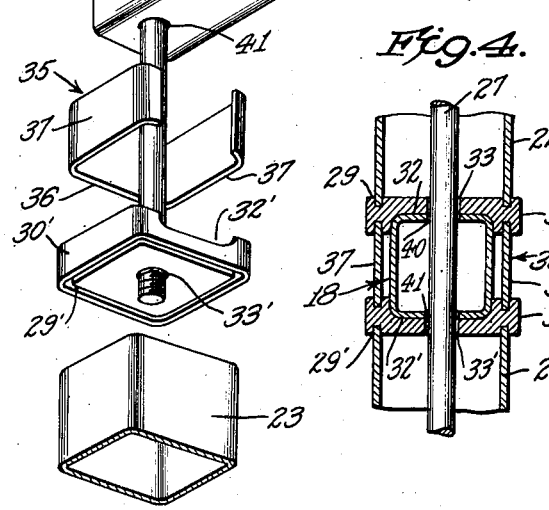
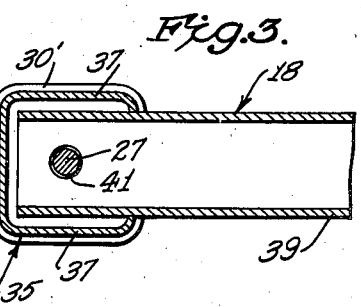
INVENTOR.
WARREN McARTHUR
BY
F. J. Pisarra
ATTORNEY Patented Aug. 2, 1949

2,477,997

UNITED STATES PATENT OFFICE 2,477,997

TUBULAR JOINT

Warren McArthur, Bantam, Conn., assignor, by mesne assignments, to Reconstruction Finance Corporation, New York, N. Y., a corporation of the United States Application August 10, 1945, Serial No. 610,025

7 Claims. (Cl. 287—54)

This invention relates to a structural joint, and in one of its more specific aspects, to a structural tubular joint adapted to be advantageously employed with metal furniture and the like.

Several noteworthy advances have been made in recent years in the art of joining together tubular metal frame members forming elements of articles of furniture and the like. For example, in my Patents Nos. 2,035,488 and 2,035,489, both granted March 31, 1936, there are disclosed several types of improved joints involving tubular members. Also, in my Patent No. 2,230,889, granted February 4, 1941, there is illustrated an improved construction and arrangement of parts employed in connecting together tubular and non-tubular frame members. The tubular joints of the prior art have been directed, for the most part, to joining together tubular elements that are circular in cross section.

The present invention is primarily concerned with an improved joint between tubular parts that are non-circular in cross section. I have found that an effective rigid joint may be made between tubular elements having at least one pair of parallel opposing external surfaces. The tubular joint of this invention is particularly well adapted for joining together tubular elements that are rectangular or square in cross section. For the purpose of setting forth the construction herein contemplated, the ensuing description and the illustrated embodiment of this invention are directed to structural tubular joints wherein the tubular elements are square in cross section.

An important object of the invention is to provide a substantially rigid joint between tubular elements of the character indicated above.

Another object of the invention is to provide a simple, lightweight and rugged joint between tubular elements that have at least one pair of parallel opposing external surfaces.

This invention has for a further object the provision of a tubular joint of the character indicated that may be manufactured at reasonable cost and that may be readily assembled and disassembled as required.

A still further object of the invention is to provide a tubular joint that possesses requisite strength, that presents an attractive appearance, and that is adapted to be employed with various articles of furniture, supporting structures, and the like.

The various objects, features and advantages of this invention will be readily understood by persons skilled in the art by reference to the detailed description that follows, taken with the accompanying drawing, which respectively describe and illustrate a preferred form of the invention embodied in a simple chair by way of example.

In the drawing:

Figure 1 is a perspective view of the chair having the joint of this invention incorporated therein;

Figure 2 is an enlarged cross-sectional view taken along the line 2—2 of Figure 1, with parts broken away for better illustration;

Figure 3 is a horizontal cross-sectional view taken along the line 3—3 of Figure 2;

Figure 4 is a transverse cross-sectional view taken along the line 4—4 of Figure 2; and Figure 5 is an exploded view in perspective of the elements comprising the joint depicted in Figure 2.

Referring now to the drawings, wherein like reference numerals denote corresponding parts throughout the several views, and more particularly to Figure 1 thereof, there is shown a chair including a seat frame 10 of angle form, having a preferably continuous top flange 11 and side flange 12, and carrying a seat cushion 13 that is removably secured thereto in any manner known to the art. The seat frame is supported on front legs 14 and rear legs 15. Extending upwardly of seat frame 10 is a tubular back frame 16 that carries a detachable back cushion 17. Each front leg 14 is coupled to and maintained in spaced apart relation with respect to its corresponding rear leg 15 through the medium of a stretcher 18 and joints constructed in accordance with this invention, generally denoted by numeral 19 in Figure 1 and shown in detail in other figures. The chair may be provided with a brace 20 that extends between stretchers 18 and that may form joints 21 therewith of the same type as joints 19. Chair legs 14 and 15, stretchers 18 and brace 20 are all preferably of square tubing construction.

As is best shown in Figure 2, each front leg 14 may include a pair of separated square tubular members 22 and 23. The upper end of tubular member 22 is disposed in a continuous groove 24 formed in the under surface of a washer 25, that is welded or otherwise secured to flange 11 of the seat frame. An opening 26 extending through top flange 11 and washer 25 is adapted to receive a tensioning rod 27 and non-rotatably engage the upper end portion 28 thereof. The lower end of tubular member 22 is received in a continuous groove 29 in the upper portion of a square washer 30 that is provided with a generally U-shaped groove 31 and a recess 32 in its lower end (Figure 5). The upper end of tubular member 23 is adapted to register with a groove 29' in a square washer 30' that is preferably identical with washer 30 but arranged in inverted relation with respect thereto, and provided with a groove 31' and a recess 32' corresponding to groove 31 and recess 32 of washer 30. Washers 30 and 30' are provided with central openings 33 and 33', respectively, for the passage of the shank of rod 27.

Intermediate washers 30 and 30' and adapted to register at its opposite ends with grooves 31 and 31' is a generally U-shaped spacer element 35 (Figure 5), consisting of a web portion 36 and a pair of arms 37.

Each stretcher 18 may include a square tubular member 39 having aligned openings 40 and 41 in its upper and lower sides, respectively, proximate one end for the reception of rod 27. It will be observed from Figures 2 and 5 that one end of tubular member 39 is located in the recesses between washers 30 and 30' and that web portion 36 of U-shaped member 35 is disposed across the end of member 39, while arms 37 extend along the exterior of the side surfaces of member 39. A partition 42 firmly secured across the interior of tubular member 23 is provided with an opening 43. The lower end portion of rod 27 is threaded to receive a nut 44 which, when tightened, bears against the under surface of partition 42 to draw the parts together into a rigid unitary assembly as shown in Figure 2. A plug 45 closes the lower end of tubular member 23 and also serves as the foot for chair leg 14.

Washers 30 and 30', grooves 31 and 31', and spacer element 35 are so arranged, when the parts of the joint are in fully assembled relation as shown in Figure 2, that the major portion of the compressive force between tubular members 22 and 23 is imparted to spacer element 35. A minor portion of this compressive force is transmitted to the part of tubular member 39 between washers 30 and 30' and is sufficient to form a snug and rigid union without any noticeable deformation of tube 39.

From the foregoing, it will be seen that the construction herein shown and described is well adapted to accomplish the objects of the present invention. It will be understood, however, that the invention may be embodied otherwise than here shown, and that in the form illustrated certain obvious changes in construction may be made. For example and not by way of restriction, it will be apparent that tubular members 22, 23 and/or 39 may be rectangular in cross section instead of square, as illustrated. Therefore, I do not wish to be limited precisely to the construction herein shown except as may be required by the appended claims, it being understood that the term "square," as recited in the claims, is to be interpreted as including "rectangular."

I claim:

1. In a structural joint of the character described, a pair of separated tubular members, a third tubular member having one end disposed between adjacent ends of said pair of members and projecting laterally therefrom, each of said members having at least one pair of parallel opposing external surfaces, means for maintaining said pair of members in spaced relation, said means comprising an element having an opening therein for the reception of said one end of said third member, and means in said pair of members and extending through said element and said one end of said third member for clamping the foregoing parts together.

2. In a structural joint of the character described, a pair of separated tubular members, a third tubular member having one end disposed between adjacent ends of said pair of members and projecting laterally therefrom, each of said members having at least one pair of parallel opposing external surfaces, means including a generally U-shaped element for maintaining said pair of members in spaced relation, said U-shaped element comprising a web and a pair of arms respectively positioned across said one end and along the exterior of said one pair of parallel surfaces of said third member, and means in said pair of members and extending through said U-shaped element and said one end of said third member for clamping the foregoing parts together.

3. In a structural joint of the character described, a pair of separated square tubular members, a third square tubular member having one end disposed between adjacent ends of said pair of members and projecting laterally therefrom, means including a generally U-shaped element for maintaining said pair of members in spaced relation, said U-shaped element comprising a web and a pair of sides respectively positioned across said one end and along the exterior of a pair of opposing sides of said third member, and means in said pair of members and extending through said U-shaped element and said one end of said third member for clamping the foregoing parts together.

4. In a structural joint of the character described, a pair of substantially coaxial spaced square tubular members, a third square tubular member having one end disposed between adjacent ends of said pair of members and projecting laterally therefrom, a pair of spaced washers, each of said washers abutting a corresponding adjacent end of said pair of members, a generally U-shaped element comprising a web and a pair of arms respectively positioned across said one end and along the exterior of a pair of opposing sides of said third member, adjacent sides of said washers being grooved to receive the ends of said U-shaped element and the other pair of opposing sides of said third member, and means in said pair of members and extending through said washers, said U-shaped element and said one end of said third member for clamping the foregoing parts together.

5. In a structural joint of the character described, a pair of substantially coaxial spaced square tubular members, a third square tubular member having one end disposed between adjacent ends of said pair of members and projecting laterally therefrom, a pair of spaced washers, one end of each washer being slotted to receive a corresponding adjacent end of said pair of members, a generally U-shaped element comprising a web and a pair of arms respectively positioned across said one end and along the exterior of a pair of opposing sides of said third member, adjacent sides of said washers being grooved to receive the ends of said U-shaped element and the other pair of opposing sides of said third member, and means in said pair of members and extending through said washers, said U-shaped element and said one end of said third member for clamping the foregoing parts together.

6. In a structural joint of the character described, a pair of substantially coaxial spaced square tubular members, a third square tubular member having one end disposed between adjacent ends of said pair of members and projecting laterally therefrom, a pair of spaced washers, each of said washers abutting a corresponding adjacent end of said pair of members, a generally U-shaped element comprising a web and a pair of arms respectively positioned across said one end and along the exterior of a pair of opposing sides of said third member, adjacent sides of said washers being grooved to receive the ends of said U-shaped element and the other pair of opposing sides of said third member, and means including a rod in said pair of members and extending through said washers, said U-shaped element and said one end of said third member for clamping the foregoing parts together.

7. In a structural joint of the character described, a pair of substantially coaxial spaced square tubular members, a third square tubular member having one end disposed between adjacent ends of said pair of members and projecting laterally therefrom, a pair of spaced washers, one end of each washer being slotted to receive a corresponding adjacent end of said pair of members, a generally U-shaped element comprising a web and a pair of arms respectively positioned across said one end and along the exterior of a pair of opposing sides of said third member, adjacent sides of said washers being grooved and recessed to receive, respectively, the ends of said U-shaped element and the other pair of opposing sides of said third member, and means including a rod in said pair of members and extending through said washers, said U-shaped element and said one end of said third member for clamping the foregoing parts together.

WARREN McARTHUR.

REFERENCES CITED

The following references are of record in the file of this patent:

UNITED STATES PATENTS

| Number | Name | Date |
| --- | --- | --- |
| 1,932,794 | McArthur | Oct. 31, 1933 |
| 2,018,539 | Welsh et al. | Oct. 22, 1935 |
| 2,035,489 | McArthur | Mar. 31, 1936 |
| 2,230,889 | McArthur | Feb. 4, 1941 |

FOREIGN PATENTS

| Number | Country | Date |
| --- | --- | --- |
| 23,255 | Great Britain | Oct. 21, 1911 |
| 535,770 | France | Jan. 31, 1922 |